Patented Sept. 23, 1952

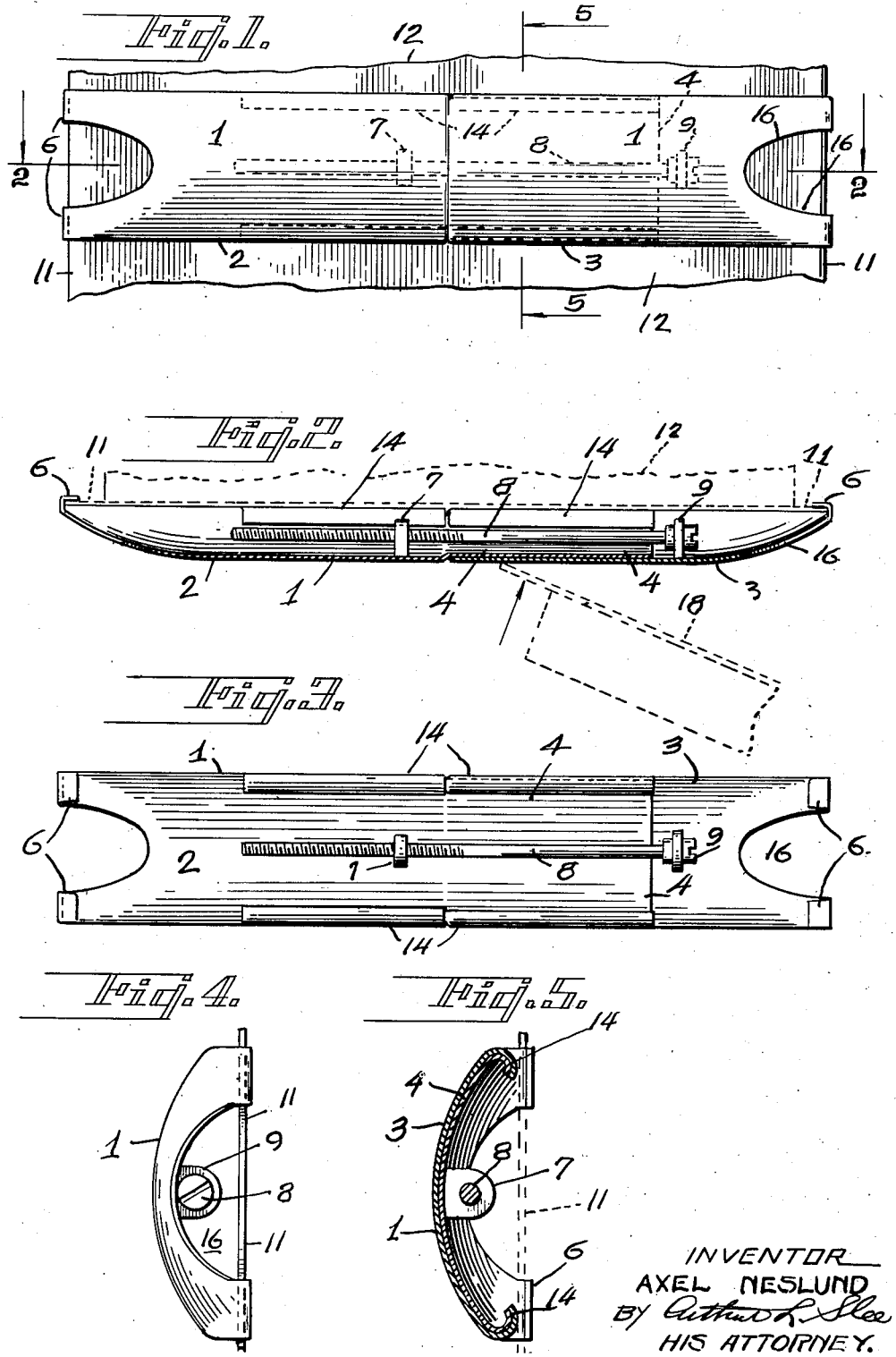

2,611,637

UNITED STATES PATENT OFFICE 2,611,637

AUTOMOBILE DOOR BUFFER

Axel Neslund, San Francisco, Calif.

Application December 6, 1949, Serial No. 131,259

2 Claims. (Cl. 293—1)

The present invention relates to improvements in a buffer bar for an automobile door, wherein a pair of longitudinally telescopic arcuate sections operate in conjunction with parallel hooks formed upon opposite ends of opposite sections and a screw bolt for moving or telescoping said sections to move said hooks into engaging relation with opposite sides or edges of an automobile door or the like, whereby said door may be protected from injury due to an impact from the edges of doors upon other immediately adjacent autos, such as in stalls in a public garage or close parking lots or the like, and whereby said doors may be kept undamaged on their outer surfaces from indentations, scratches and other disfiguring blemishes.

The primary object of the present invention is to provide a new and improved buffer or bar for an automobile door having improved means adapted to receive and absorb the shock of an impact upon said door to prevent injury thereto.

Another object is to provide a new and improved device of the character set forth having improved means adapted to easily and readily attach and hold the same to doors of various widths whereby the same may be adapted to various types of vehicles.

A further object is to provide a new and improved device of the type described having a greatly simplified and economically produced construction and a maximum efficiency.

The invention comprises the improved device disclosed in the drawings forming a part of the present application, and in which—

Figure 1 is a broken front elevation of an automobile door with my improved buffer applied thereto;

Figure 2 is a longitudinal section taken on line 2—2 of Figure 1, in the direction indicated;

Figure 3 is a rear elevation of the device removed from the door;

Figure 4 is an enlarged end elevation of the right hand end of Figure 1, with the door omitted; and Figure 5 is an enlarged transverse section taken on line 5—5 of Figure 1, in the direction indicated.

Referring to the drawings:

The numeral 1 is used to designate in general a preferably horizontally disposed buffer or bar composed of a pair of longitudinally telescopic arcuate sections 2 and 3, the section 2 being provided with a reduced portion 4 upon which the second section 3 slidably is mounted. Spaced parallel hooks 6 are formed upon the opposite ends of opposite sections 2 and 3 and are adapted to engage opposite side edges or rims 11 of an automobile door 12. The first section 2 is provided with a screw-threaded bearing 7 operatively engaged by a suitable bolt or screw 8 having the head thereof mounted for rotation only within a suitable bearing 9 mounted within the transversely arcuate second section 3, whereby said sections 2 and 3 may be telescoped or collapsed into each other, substantially, by rotation of said bolt or screw 8, which will operate to move the hooks 6 into engaging relation with their respective rims or edges 11 of the sides of the door 12. The sides of the sections 2 and 3 also are provided with preferably integrally formed and longitudinally disposed rolls or beads 14, rather than a sharp corner or straight edge which would tend to mar the surface of a door 12 by transmitting an impact thereto.

In operation; the buffer or bar 1 is placed preferably in a horizontal position across the outer surface of an automobile door 12 and a screw driver or other suitable tool, not shown, is inserted within the space 16 between the hooks 6 on the end of the second section 3, to engage and rotate the bolt or screw 8 and thereby collapse or telescope said sections until the hooks 6 on the opposite ends thereof are moved into rigid engaging relation with the edges or rims 11 of the door 12, as fully disclosed in Figures 1 and 2 of the drawings.

Thus an outwardly extended and transversely arcuate buffer surface is presented in spaced relation to the outer polished surface of an automobile door 12, so that when the vehicle is closely parked or immediately adjacent another, as in a public garage or parking lot, said buffer or bar 1 readily and efficiently will absorb the shock and impact of a door, indicated in dotted lines in Figure 2 of the drawings, as at 18, and thereby prevent the edge or rim of said intruding door from damaging the first door 12. In addition, the rolled or beaded sides 14 of the sections will present a smoother surface of the bar or buffer 1 to the outer surface of the door 12 being protected, whereby damage from the buffer or bar 1 itself may be prevented.

Having described my invention, I claim:

1. An automobile door buffer comprising a bar composed of a pair of slidably connected and longitudinally telescopic sections, arcuate in cross section and having spaced and parallel hooks formed on opposite ends of opposite sections and adapted to engage opposite side edges of an automobile door; a threaded bearing mounted within one section; and a screw rotatably mounted upon the other section and engaging said threaded bearing and adapted to telescope said sections and move said hooks thereon into engaging relation with opposite side edges of an automobile door.

2. An automobile door buffer comprising a bar composed of a pair of slidably connected and longitudinally telescopic sections arcuate in cross section, and having rolled side edges and spaced parallel hooks formed integrally upon opposite ends of opposite sections, said hooks being adapted to engage opposite side edges of an automobile door; a threaded bearing mounted within one arcuate section; and a bolt rotatably connected to the other section and engaging said threaded bearing in said first section and adapted to telescope said sections longitudinally and move said hooks into engaging relation with opposite side edges of an automobile door.

AXEL NESLUND.

REFERENCES CITED

The following references are of record in the file of this patent:

UNITED STATES PATENTS

| Number | Name | Date |
|---|---|---|
| 2,111,814 | Schulman | Mar. 22, 1938 |
| 2,341,048 | Kopp | Feb. 8, 1944 |
| 2,456,157 | Tadd | Dec. 14, 1948 |